(No Model.) 5 Sheets—Sheet 1.

U. H. ODELL.
ROLLER MILL.

No. 339,927. Patented Apr. 13, 1886.

Attest
A. Gluchowsky
Joseph H. Sims

Inventor
Adolpho H. Odell
by Ward & Boyse
Attorneys (No Model.) 5 Sheets—Sheet 2.

U. H. ODELL.
ROLLER MILL.

No. 339,927. Patented Apr. 13, 1886.

Attest
A. Gluchowsky
Joseph H. Sims

Inventor
Adolph H. Odell
by Wood & Boyd
Attorneys (No Model.) 5 Sheets—Sheet 3.
U. H. ODELL.
ROLLER MILL.
No. 339,927. Patented Apr. 13, 1886.
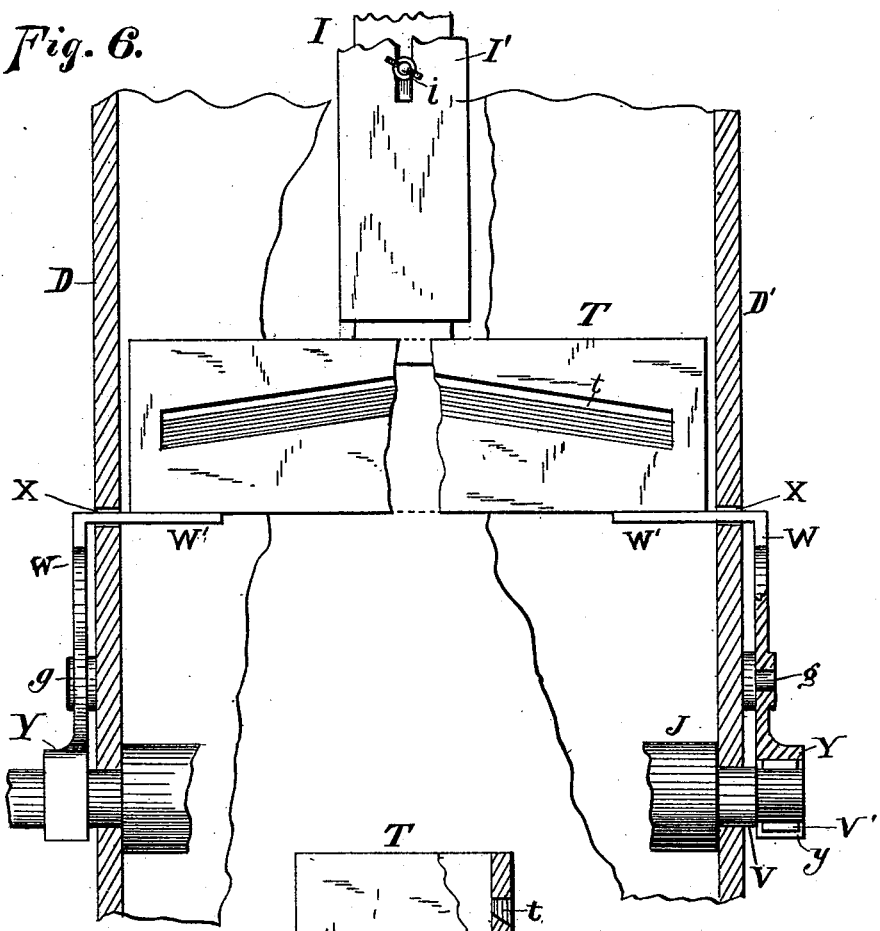
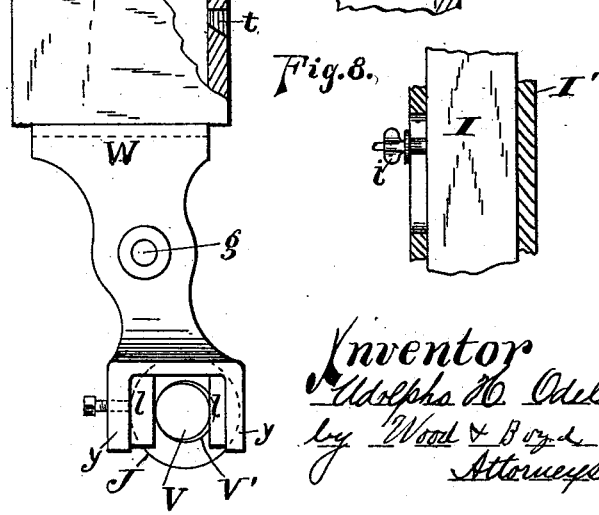
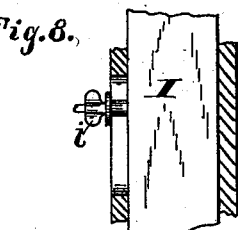
Attest
A. Gluchowsky
Joseph H. Sims
Inventor
Adolph H. Odell
by Wood & Boyd
Attorneys (No Model.)  5 Sheets—Sheet 4.
U. H. ODELL.
ROLLER MILL.
No. 339,927. Patented Apr. 13, 1886.
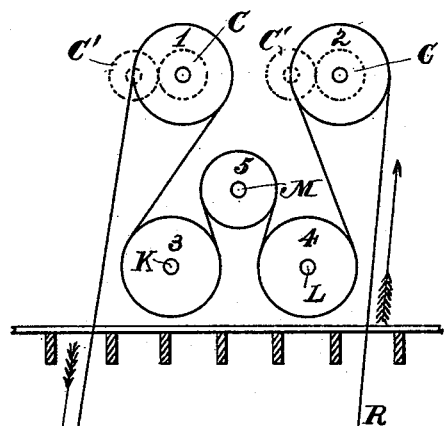
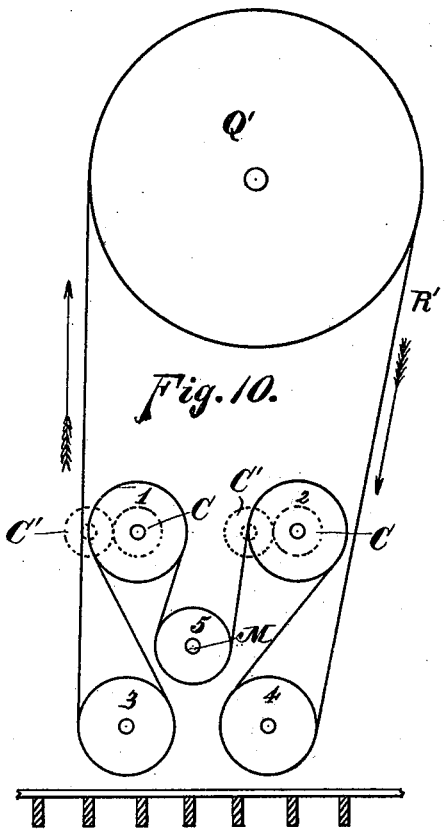
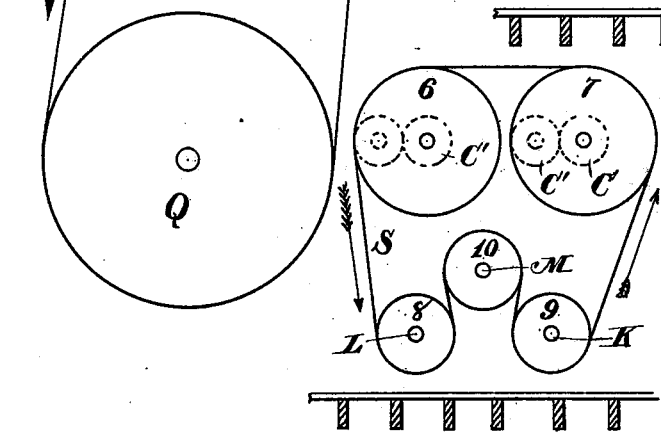

(No Model.) 5 Sheets—Sheet 5.
U. H. ODELL.
ROLLER MILL.
No. 339,927. Patented Apr. 13, 1886.
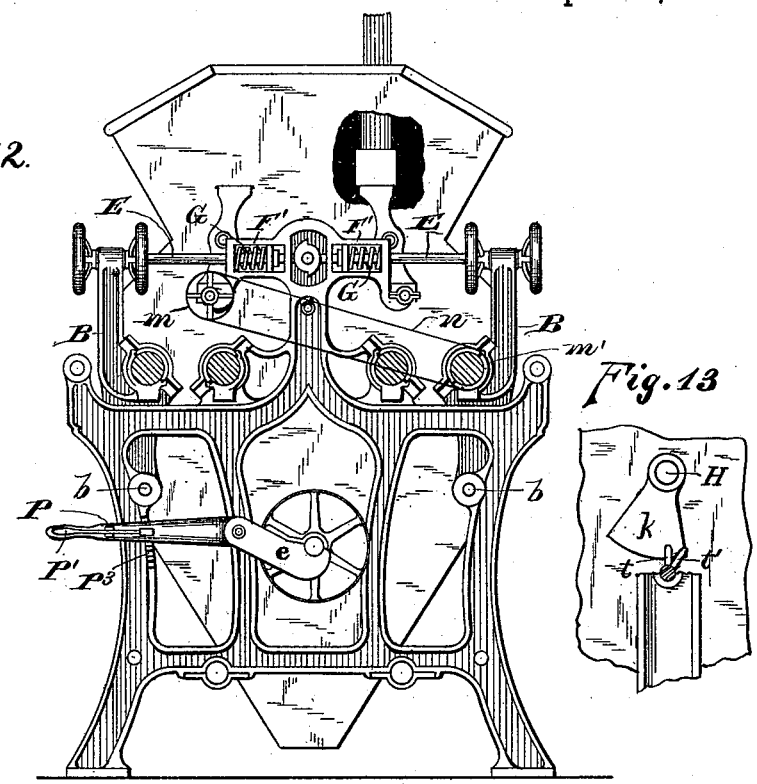
Fig. 12.
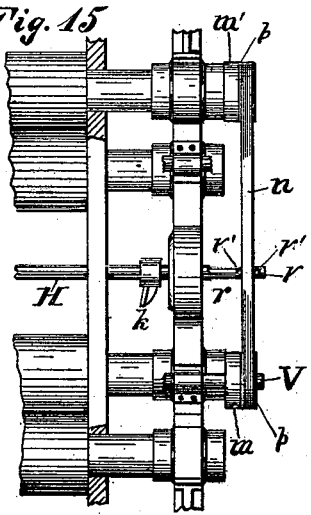
Fig. 13.
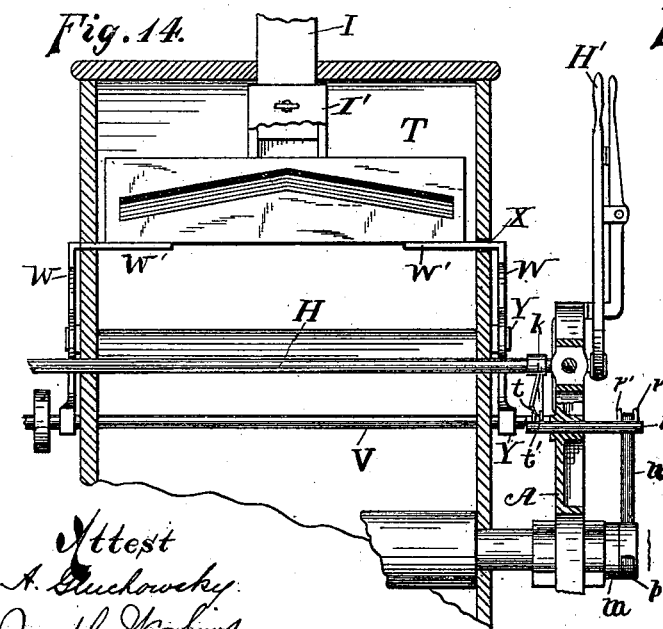
Fig. 14.
Fig. 15.
Attest
A. Gluchowsky
Joseph W. Sims
Inventor
Udolpho H. Odell
by Wood & Boyd
Attorneys

UNITED STATES PATENT OFFICE.

UDOLPHO H. ODELL, OF DAYTON, OHIO.

ROLLER-MILL.

SPECIFICATION forming part of Letters Patent No. 339,927, dated April 13, 1886.

Application filed March 7, 1884. Serial No. 123,413. (No model.)

*To all whom it may concern:*

Be it known that I, UDOLPHO H. ODELL, a citizen of the United States, and a resident of Dayton, in the county of Montgomery and State of Ohio, have invented certain new and useful Improvements in Roller-Mills, of which the following is a specification.

My invention relates to improvements in roller-mills, and more particularly to the class shown and described in Reissued Letters Patent No. 10,139, granted me June 20, 1882.

One of the objects of my invention is to provide transmitting-shafts with driving-pulleys upon each end thereof, so located with reference to the driven pulleys on the ends of the crushing-roll shafts that the mill may be driven from a main shaft, located either above or below the mill, whichever may be desired, without change of the shafts and pulleys of the mill.

Another object of my invention is to cheapen and simplify the construction of transverse shafts and adjusting-springs for holding the rolls in position and allowing them to yield or to be moved by the spreading mechanism.

Another object of my invention is to provide automatic agitating feed devices arranged in the hopper, so as to uniformly distribute the charge fed to the crushing-rolls and prevent the choking of the material in the hopper, all of which will be fully set forth in the description of the accompanying drawings, in which—

Figure 1:
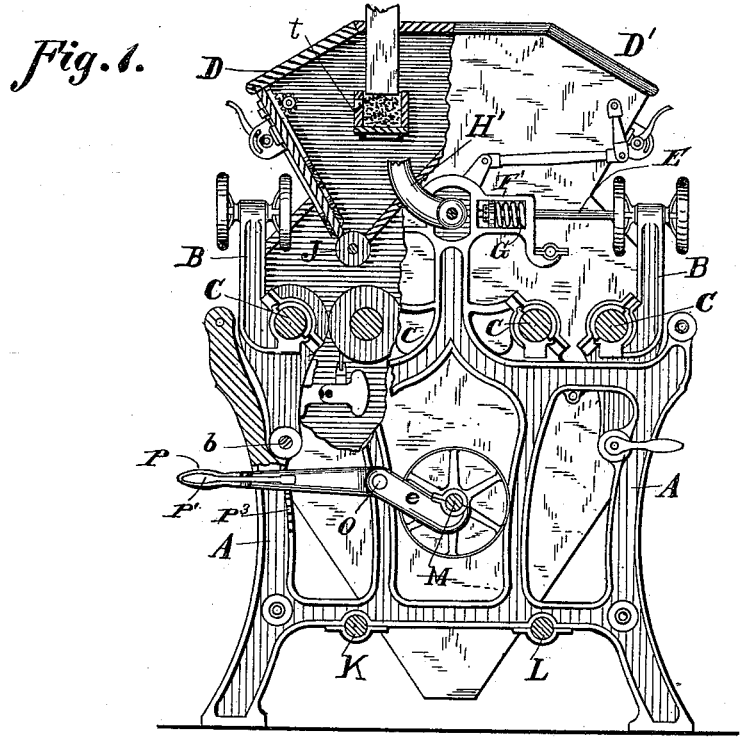
Figure 2:
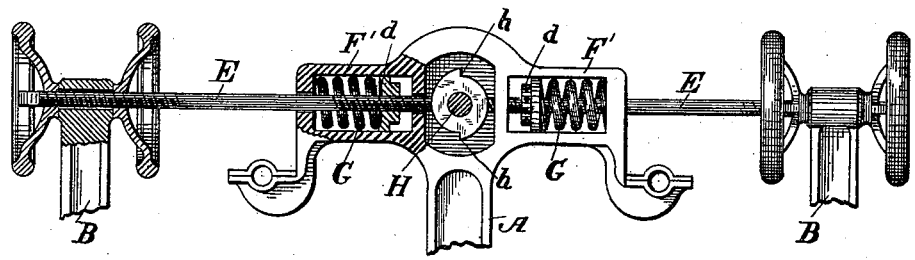
Figure 3:
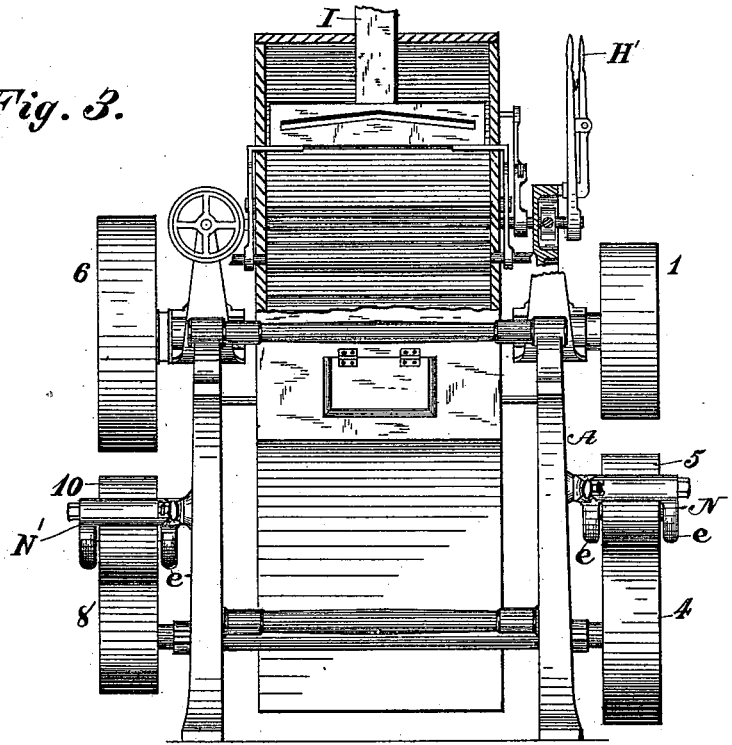
Figure 4:
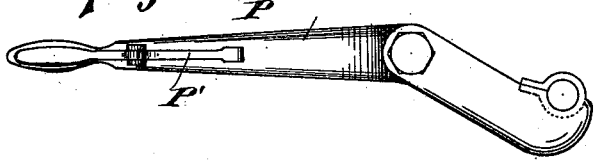
Figure 5:
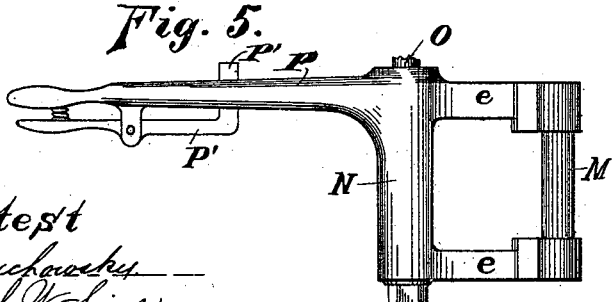

Figure 1 is an end elevation of my improved mill; Fig. 2, an elevation, partly in section, of the transverse adjusting-shaft and springs, &c. Fig. 3 is a side elevation of my improved mill; Fig. 4, an elevation of the tightener-pulley, frame, and adjusting-lever; Fig. 5, a top plan view of the device shown in Fig. 4. Fig. 6 is an enlarged broken sectional elevation of the agitating feed device and hopper. Fig. 7 is an end elevation of the feeding device; Fig. 8, a detailed sectional view of the feed-spout. Fig. 9 is a diagram in elevation representing one end of the machine, with the crushing-rolls driven from a pulley underneath the machine. Fig. 10 is a similar diagram of the same end of the machine, but with the driving-pulley located over the machine. Fig. 11 is a diagram of the means for driving the other set of crushing-rolls at the opposite end of the machine from that shown in Figs. 9 and 10. Fig. 12 is an end elevation of the machine, the belting mechanism for the grinding-rolls being removed. Fig. 13 is an enlarged elevation of the cam and shifting-rod. Fig. 14 is an enlarged sectional elevation showing the belt-shifting mechanism, and Fig. 15 is a top plan view of the same.

A represents the frame of the machine.

B represents pivoted journal-arms for the movable crushing-rolls, which are suitably journaled upon said arms.

*b* represents the pivots connecting said journal-arms to the frame A.

C represents the movable crushing-rolls journaled upon the arms B.

*c* represents the stationary crushing-rolls.

D D represent the hoppers located above the crushing-rolls, and J the feeding-rolls located at the mouths of the hoppers.

E represents transverse shafts for connecting the swinging journal-arms to the spreading mechanism. There are four of these transverse shafts, two upon each end of the machine, and located as shown in Figs. 1 and 12.

F' represents spring-housings formed upon the frame at the inner ends of the shafts E.

G represents coiled springs located in said housings, loosely surrounding the shafts E. The outer end of each of these respective springs seats against the housing, and the other end seats against the inner face of a washer held by the adjusting-nuts *d*. Spiral grooves may be formed on the faces of the washers, and a similar groove in the housings, to receive the ends of the springs and hold them in position. The adjusting-nuts *d* are screw-threaded to engage with threads formed upon the inner ends of the shafts E. The peripheries of these nuts *d* fit loosely in the housing, so that they may be turned to compress the springs G. The tension of springs G against the nuts *d* forces the shafts E and journal-arms B inward, and they should be adjusted so as to bring the movable rolls C into proper relative position with the stationary crushing-rolls *c*, when the parts are in the position shown in Fig. 2. These springs will yield to undue strains and allow the rolls to spread momentarily and return to their places automatically.

In order to spread the rolls C *c* when the feed is cut off at the hopper, I have provided the following instrumentalities: H represents the through-shaft journaled centrally on the frame A, between the transverse shafts E. *h h* represent cams formed upon the face of the shaft H, opposite the transverse shafts E. The end of each of these shafts presses against the face of one of the cams *h*. A lever, H', is attached to shaft H, so as to rotate it and turn the cams *h*, which bear against the ends of the transverse shafts E, forcing them, together with their attached journal-arms B, outwardly and spreading the rolls C, or separating them from close relation to the rolls *c*. A reverse movement of the shaft H and cams *h* will allow the transverse shafts E to resume their normal position under the retractile force of springs G. These parts (shown in Figs. 1 and 2) are duplicated upon each end of the machine.

Instead of employing cams, eccentrics or cranks and links might be employed to move the shafts E by the rotation of shaft H.

It is very desirable to drive a series of reducing-rolls by belts running over pulleys, and to employ but a single belt at each end of the machine, which also allows the use of tightener-pulleys to simultaneously stop and start the movement of both sets of rolls. It is also desirable to so arrange the driving-pulleys upon the ends of the crushing-roll shafts that the belts may be driven from a main shaft and driving pulley located either above the mill or below it, said main shaft and driving-pulley being arranged in the same vertical plane as a single belt at either end of the machine, and said main shaft having its bearings arranged either overhead or beneath the frame proper of the machine. I attain this by the following instrumentalities: 1 and 2 represent driving-pulleys keyed upon the shafts of one of the rolls of each set. 3 and 4 represent transmitters keyed upon counter-shafts K L, which are suitably journaled upon the frame of the machine underneath the pulleys 1 and 2. 5 represents the tightener or idler-pulley keyed upon the shaft M, which is journaled upon the forks *e e* of the hanger frame or bracket N, which is pivoted to the through-shaft O, which passes through the frame of the machine, to which it is suitably journaled. N' represents a duplicate hanger frame or bracket at the opposite end of the machine, on which is journaled the tightener-pulley 10. P represents a lock-lever for oscillating the shaft O and the hanger-frames N N', thereby raising or lowering the tightener-pulleys 5 and 10, for stopping and starting the machine by the slacking or tightening of the belts, said lever P having a pivoted spring catch or dog, P', which engages with a rack, P³, on the frame of the machine and serves to retain said lever in a locked position. Pulleys 6 and 7 are keyed upon the shafts of the opposite crushing-rolls of the sets, located on the opposite end of the machine from pulleys 1 and 2. 8 and 9 represent transmitting-pulleys keyed upon the shafts L K in the same vertical plane with pulleys 6 and 7. 10 represents the tightener-pulley journaled upon the oscillating bracket N'. Fig. 9 is a diagram representing one of the reducing-rolls of each of the sets driven by the driving-pulley Q, located under the machine. R represents the single driving-belt, which passes over the pulleys in the direction indicated by the arrows. Fig. 10 represents a diagram of driving-pulley Q', located above the machine. R' represents the driving-belt passing over the pulleys in the direction indicated by the arrows. It will be seen that this mode of arranging the pulleys 1 2 3 4 5 upon their respective shafts allows one set of rolls to be driven either from above or below, as may be desired, the other rolls of the sets being driven by the single belt S, on the opposite end of the machine, by means of the transmitters 8 and 9, which are driven by the shafts K L, the driving-belt passing in the manner indicated by the arrows in Fig. 11. This result is obtained whether the mode of driving is used as shown in either Figs. 9 or 10.

In the use of roller-mills it is difficult to feed light grist—such as bran containing a small amount of middlings—in such a manner as to distribute it uniformly the entire length of the rolls. To overcome this objection, and to provide a uniform feed, I have devised the following agitating feeding device: I represents a feed-spout leading to the hopper. I' represents a secondary adjustable feed-spout, which is made to slide up and down upon spout I, so as to regulate the termination of the mouth of the discharge with reference to the agitating-hopper T. *i* represents a set-screw for securing the adjustment of the movable spout I'. T represents an agitating hopper or trough. *t* represents an oblong slot cut through one side of the hopper-box T, forming a feed-orifice. It is preferably made inclined from the center, or from the location of the feed-spout I, as the material in the hopper T is higher underneath the feed spout I than at the ends of the hopper T.

In order to agitate or reciprocate the hopper T, so as to shake the material out through the slot *t*, and thereby distribute it uniformly throughout the entire length of the crushing-rolls, I provide the following instrumentalities: V' represents eccentrics formed upon the driving-shaft V of the feed-roll J. W represents arms journaled upon pivots *g*, projecting from the sides of the hopper D. W' represents bent ends of arms W, which pass through elongated slots X, pierced in the sides of the hopper D, and rigidly secured to the reciprocating hopper T. *y y* represent forks at the lower ends of arms W. *l l* represent anti-friction plates secured upon the inner faces of forks *y y*, which bear upon the peripheries of the eccentrics V'. The shaft V is driven by a belt, *n*, and pulleys *m m'*. It is necessary to stop the motion of the agitator feed-box T when the rolls are spread apart, and to accomplish this result I provide loose pulleys *p p*, journaled upon the shafts to which the pulleys m m' are keyed. k represents a segmental cam keyed upon shaft H. r represents a rod journaled in the frame A, and provided with pins r' r' on its outer end and pins or guides t t on its inner end. The belt n passes between pins r' r', and the cam k, passing between the pins t t, moves the rod r inward or outward, thereby shifting the belt from the loose pulleys p p onto the pulleys m m', or vice versa, as the shifting rod r is drawn inward or outward by the cam k. This cam, being connected to the shaft H, is operated by the lever H', so that the motion of the driving-shaft V is stopped and started simultaneously with the spreading of the rolls apart. It is not necessary to employ the feed-rolls J in all cases when the automatic feed is used, and I have omitted the same in Fig. 14. The feed upon the opposite side of the machine is driven, connected, and disconnected by means of the through-shaft and the other mechanism in the same manner as that shown in Figs. 12, 13, 14, 15.

The operation of the automatic feed is as follows: The eccentrics V', engaging with the forks y y, oscillate the arms W at each revolution, shake the box T and the material fed into it out through the slot or opening t, and distribute it uniformly along the length of the crushing-rolls. I have shown the feed-roll J in position for the feed to fall upon and to be carried over by its revolution onto the crushing-rolls; but when the agitating feed-hopper T is employed this feed-roll J is not essential to the uniform distribution and regulation of feed. The use of the slot t in the hopper T is not essential, as the feed might be shaken out over the upper edge. So, also, the other instrumentalities for shaking the agitating-hopper T might be employed in lieu of the devices herein shown, the essential features of the feeding device being the agitating-hopper T, arranged longitudinally above the reducing-rolls and fed by a conveyer-spout, I, and adapted to be simultaneously stopped by the lever which spreads the rolls, which I believe I am the first to accomplish.

I claim—

1. In a grinding-mill, the combination, with a double set of crushing or reducing rolls, of the pulleys 1 and 2, the idler or tightening pulley 5, the guide-pulleys 3 4, the single belt R, and the main pulley and driving-shaft Q, arranged in the same vertical plane as said belt, substantially as described.

2. In combination with the reducing-rolls having pulleys 1 and 2 and 6 and 7, the shafts K L, having the driving-pulleys 3 and 4 and 8 and 9, the tightener-pulleys 5 and 10, their oscillating journals, and a lever for simultaneously stopping and starting the reducing-rolls, substantially as described.

3. In combination with the reducing-rolls, the transverse shafts E, the swinging journal-arms B, the housings F', formed on the frame, springs G, and set-nuts d, adapted to regulate the tension of the springs and hold the shafts E in their working position and yet allow them to yield to undue pressure on the rolls, substantially as described.

4. The combination of the crushing-rolls, the stationary hopper, the agitating feeding-hopper arranged longitudinally over the rolls within the stationary hopper, fast and loose pulleys and belt mechanism for connecting the agitating feeding-hopper with the rolls, the through-shaft H, and belt-shifting mechanism operated by the through-shaft for shifting the belt from the fast to the loose pulleys, to stop the movement of the feeding-hopper, substantially as described.

5. The combination of the agitating feed-hopper T, the pivoted lever-arms W, having horizontal top extensions, W', connected with said hopper, and bifurcated lower ends, y, with the rotary shaft having eccentrics V, the stationary hopper, and the crushing-rolls, substantially as described.

6. In combination with the crushing-rolls of a roller-mill, the agitating feed-hopper T and the hopper above the rolls, the roller-driving mechanism, the through-shaft H, and the unshipping mechanism, whereby the agitation of the hopper T is stopped simultaneously with the spreading of the rolls, substantially as specified.

7. The combination, with the crushing-rollers of a roller-mill, of the stationary hopper, the agitating feed-hopper T, contained therein, shaking-levers pivoted on the stationary hopper and connected with the shaking hopper, a shaft having eccentrics engaging with and operating the shaking-levers, a belt-shipper acting on the belt, driving the eccentric carrying-shaft, and a through-shaft giving adjustment to the crushing-rolls, and provided with a device for reciprocating the belt-shipper, whereby the agitation of the hopper is begun or ended simultaneously with the adjustment of the crushing-rolls, substantially as described.

In testimony whereof I have hereunto set my hand.

UDOLPHO H. ODELL.

Witnesses:
A. GLUCHOWSKY,
E. E. WOOD.